Figure 1:
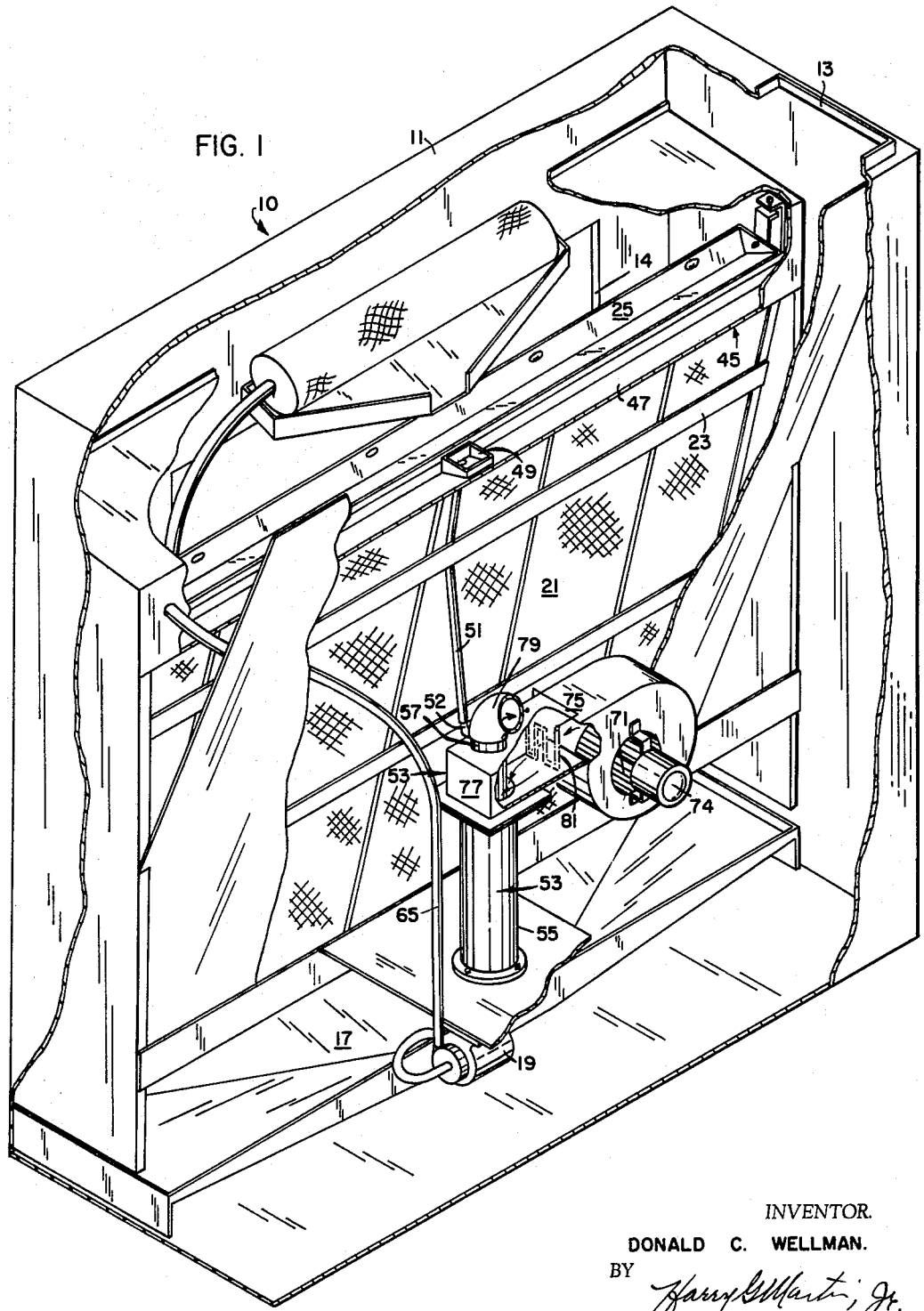

July 5, 1966 D. C. WELLMAN 3,259,172
EVAPORATIVE CONCENTRATOR FOR REGENERATING
HYDROSCOPIC LIQUIDS
Filed Oct. 17, 1963 2 Sheets-Sheet 1

INVENTOR.
DONALD C. WELLMAN.
BY
ATTORNEY.

INVENTOR.
DONALD C. WELLMAN.
BY
ATTORNEY.

United States Patent Office 3,259,172
Patented July 5, 1966

3,259,172
EVAPORATIVE CONCENTRATOR FOR REGENERATING HYDROSCOPIC LIQUIDS
Donald C. Wellman, Marcellus, N.Y., assignor to Carrier Corporation, Syracuse, N.Y., a corporation of Delaware
Filed Oct. 17, 1963, Ser. No. 316,828
1 Claim. (Cl. 159—13)

This invention relates to a device for reconcentrating a liquid medium employed to remove impurities such as odors and moisture from an air stream in which it is discharged and to a method for reconcentrating such liquid medium.

Air purifying apparatus has been proposed which employs triethylene glycol or diethylene glycol, for example, in combination with a mechanical filter, such as a contact pad or screen, through which an air stream to be treated is passed. The triethylene glycol or diethylene glycol aids in removing foreign particles in the air stream while serving to absorb most foul odors in the air. The glycol is thereafter passed through a regenerator or desorbing chamber where it is cleaned for re-use. Satisfactory reconcentration or desorption of the foreign odors from the glycol presents a difficult problem.

A primary object of this invention is to provide a device for reconcentrating a liquid medium employed to remove impurities such as odors and moisture from an air stream in which it is discharged.

An object of the invention is to provide a method of desorbing any odors from a liquid after absorption of odors by said liquid to regenerate the liquid for re-use.

A further object of the invention is to provide a device for regenerating or desorbing a liquid so designed as to prevent accumulation of solids therein. Other objects of the invention will be readily perceived from the following description.

This invention relates to a device for reconcentrating a liquid medium adapted to remove impurities such as odors and moisture from an air stream in which it is discharged which comprises in combination an inner hollow member having a first passageway therethrough, an outer member, the inner member being spaced from the outer member to form a second passageway in communication with the first passageway, means for supplying liquid to be reconcentrated to the first passageway, and means for supplying a heated stream of air through the second passageway to heat the wall of the inner member and through the first passageway in contact with the liquid to remove impurities therefrom.

This invention further relates to a method for reconcentrating a liquid medium adapted to remove impurities such as odors and moisture from an air stream in which it is discharged which consists in the steps of discharging the liquid medium in a first passageway having a heated wall, passing a heated air stream through a second passageway in a direction substantially parallel to the direction of flow of medium in the first passageway and in heat exchange relation with the wall of the first passageway to heat the same, and passing the heated air after its passage through the second passageway through the first passageway in a direction opposite the direction of flow of medium in the first passageway to remove impurities from the medium.

Figure 2:
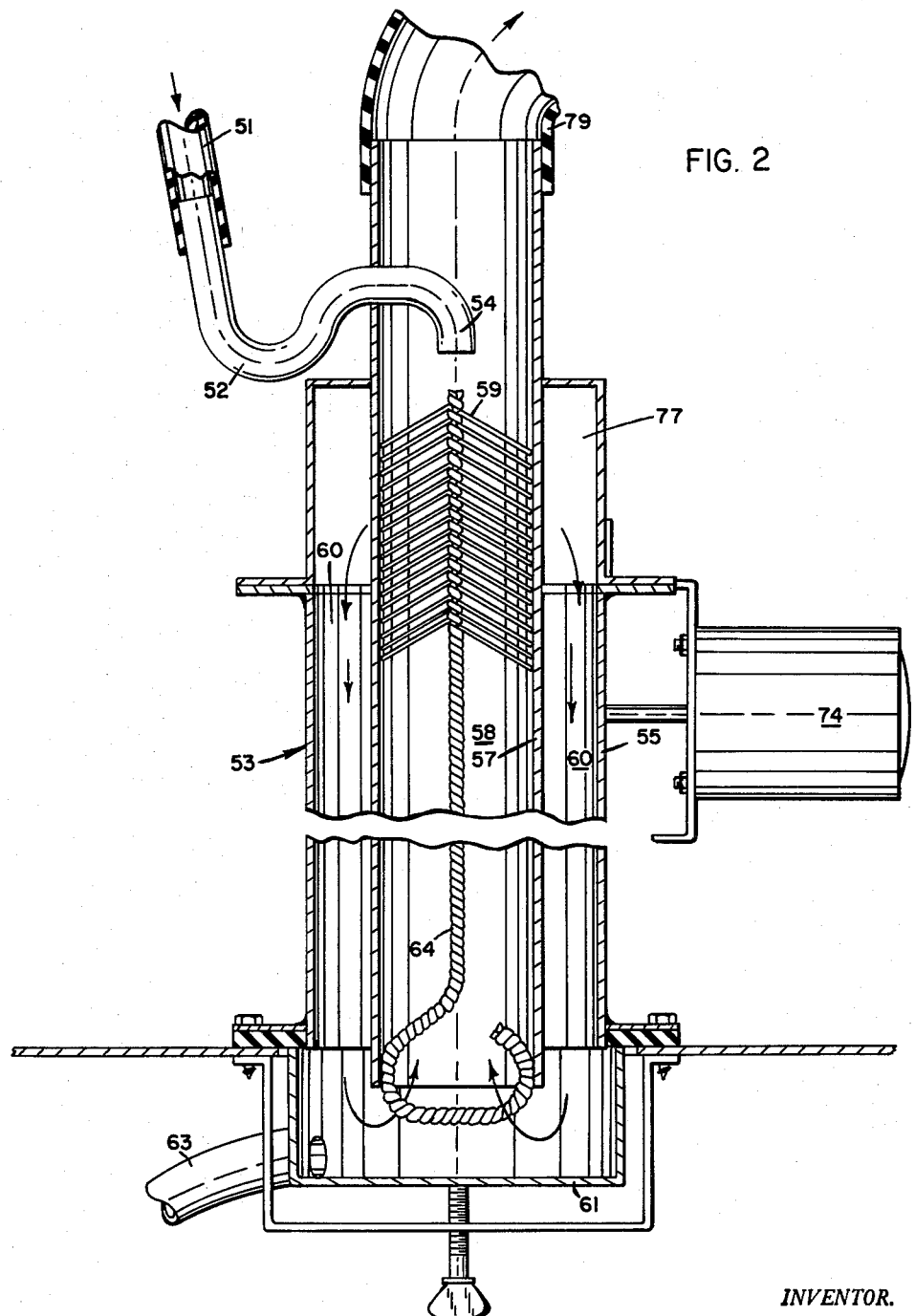

The attached drawings disclose a preferred embodiment of the invention, in which FIGURE 1 is a perspective view partially broken away of an air purifying structure including the present invention; and FIGURE 2 is a sectional view illustrating the regenerator of the air purifying structure.

Referring to the drawings, there is shown an air purifying device 10 employing the liquid reconcentrating device of the present invention. Device 10 includes a housing 11 containing a contact surface 21 in the form of a filter screen supported on brackets 23 secured between the sides of the housing. Housing 11 includes an inlet 13 and an outlet 14, both inlet and outlet being connected to ducts (not shown) of an air conditioning system to permit air to be purified to be passed through filter screen 21 and forwarded to a place of use.

A sump 17 in housing 11 receives liquid medium flowing from filter screen 21. A pivotally mounted trough 25 placed above filter screen 21 receives medium from sump 17 forwarded thereto by pump 19 through line 65. A trough tray assembly 45 is arranged beneath trough 25 to distribute the liquid medium over the filter screen 21. Assembly 45 includes a downwardly inclined baffle plate 47 extending to the filter screen 21 and a bypass receiver member 49 arranged on baffle 47. A bypass or recycle line 51 connects member 49 with a regenerator or desorbing device 53. A trap 52 is placed in line 51 for a purpose hereafter described. Thus, a minor portion of liquid medium being circulated in contact with the air stream being treated is continuously bled to the regenerator 53.

The liquid regenerating or reconcentrating device 53 includes an exterior casing 55 which may be in the form of a hollow tube and an interior tube 57 having a first passageway 58 extending therethrough in casing 55. Tube 57 is spaced from casing 55 to form a second passageway 60 between the interior wall of casing 55 and the exterior wall of tube 57. Preferably, the upper end of tube 57 extends beyond the upper end of casing 55. Tube 57 is held in substantially vertical position in casing 55 by any suitable means.

Bypass line 51 has an outlet 54 to discharge liquid medium in tube 57. A distributing member 59 comprising polypropylene bristles attached to a wire 64 is forced in tube 57 to distribute liquid in the tube. It will be appreciated other suitable distributing means may be employed if desired. Wire 64 permits ready removal of the distributing member for cleaning when required. Liquid is discharged in tube 57 and flows downwardly therein by gravity forces being distributed by member 59 in contact with the inner wall of the tube and in a heated air stream flowing upwardly in tube 57 as hereinafter described. Member 59 also serves to add surface to increase the volume of liquid in contact with the heated air stream.

A removable cup member 61 is placed below tube 57 to collect liquid flowing from the tube. Cup 61 is in communication with sump 17 through line 63 to return reconcentrated liquid to the sump. Cup 61 collects small particles of matter and is removable to permit such collected particles to be removed from the liquid circulating system.

A plenum chamber or compartment 77 surrounds tube 57 at its upper portion and is in communication with the second passageway 60. Chamber 77 is in communication with a blower 71, actuated by a motor 74, through duct 75. An electric resistance element or heater 81 is placed in duct 75 and serves to heat the air stream passing through the duct. Heated air passes from chamber 77 through second passageway 60 in a direction parallel to the direction of flow of liquid in tube 57, heating the wall of tube 57 during its passage, and passes into passageway 58, flowing upwardly in a counterflow direction to the direction of the liquid flowing through passage 58.

An exhaust flue 79 is connected to the upper end of tube 57 to vent the spent air stream, carrying impurities removed from the liquid medium, from the regenerator.

In operation, blower 71 and the heater 81 are actuated, supplying a stream of heated air to compartment 77, second passageway 60 and first passageway 58. Liquid to be reconcentrated, that is, liquid from which moisture and odors are to be removed, is discharged into tube 57, distributed in tube 57 by member 59 and flows downwardly in tube 57 in contact with the heated wall of the tube and the heated air passing upwardly in the tube. Application of heat to the liquid removes impurities such as odors and moisture from the liquid thereby reconcentrating and readsorbing the liquid. By heating the wall of tube 57 with hot air, "hot spots" are prevented which may cause chemical breakdown of the liquid and more effective and uniform heating is provided.

The present invention provides an economical reconcentrator which removes impurities such as moisture and odors from a liquid passed in contact with an air stream to be treated. More uniform heating is provided thus eliminating chemical breakdown of the liquid. Excellent heat transfer between the liquid and the air stream is afforded due to the construction of the device. Additionally, the device is so constructed as to provide ready access for cleaning and servicing, if required. The device is designed to eliminate crevasses or cavities which might collect dirt, particles collecting in the cup member and being easily removed from the device.

While a preferred embodiment of the invention has been described, it will be appreciated the invention is not limited thereto since it may be otherwise embodied within the scope of the following claim.

I claim:

In a device for reconcentrating a liquid medium, the liquid medium being adapted to remove impurities such as odors and moisture from an air stream into which it is to be elsewhere discharged, the combination of a vertical outer tube, a vertical inner tube placed in the outer tube and spaced from the inner wall of said outer tube to form a passageway therewith, said inner tube being open at both ends and extending beyond the upper end of the outer tube, a chamber surrounding the extended end of the inner tube and closing the adjacent outer tube end and in communication with the space between the inner and outer tubes forming the passageway, a liquid collecting cup closing the outer end of the outer tube, means for supplying liquid to be reconcentrated to the upper end of the inner tube, means for supplying a heated stream of air to the chamber, through the passageway to heat the wall of the inner tube and through the inner tube, and means for distributing liquid to be reconcentrated in heat exchange relation with the air stream passing through the inner tube and the heated inner wall of the tube.

References Cited by the Examiner

UNITED STATES PATENTS

| | | | |
|---|---|---|---|
| 856,048 | 6/1907 | Gaillard | 159—4 X |
| 909,460 | 1/1909 | Schrade | 159—4 |
| 986,365 | 3/1911 | Corliss | 159—4 |
| 1,020,632 | 3/1912 | Bevenot et al. | 159—4 X |
| 2,040,837 | 5/1936 | Yarmett | 196—90 |
| 2,524,753 | 10/1950 | Betts | 23—48 |
| 2,640,761 | 6/1953 | Wiseman | 159—6 |
| 2,851,097 | 9/1958 | Ledgett | 159—46 X |

NORMAN YUDKOFF, *Primary Examiner.*

J. SOFER, *Assistant Examiner.*